Figure 1:
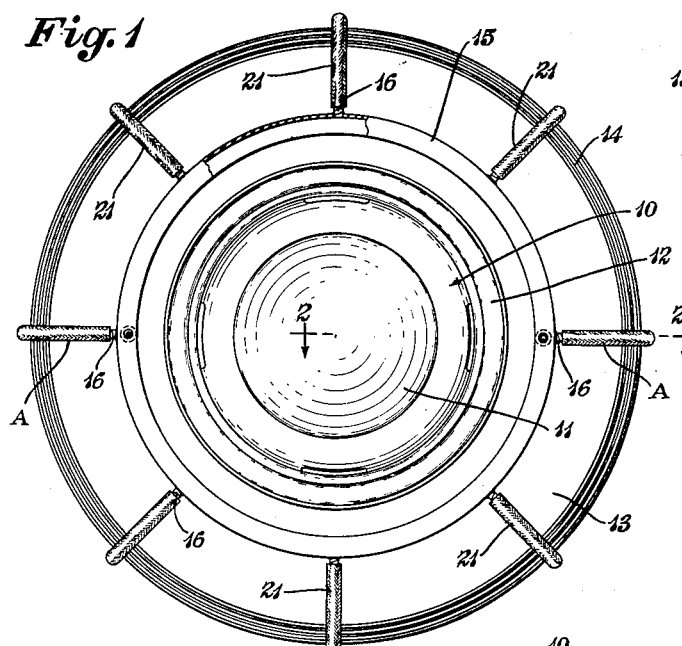

Nov. 7, 1950 — C. Q. SNEDEKER — 2,529,427
ANTISKID DEVICE FOR AUTOMOBILE TIRES
Filed Jan. 19, 1950

INVENTOR.
Claude Q. Snedeker
BY
Freass and Bishop
ATTORNEYS

Patented Nov. 7, 1950

2,529,427

UNITED STATES PATENT OFFICE 2,529,427

ANTISKID DEVICE FOR AUTOMOBILE TIRES

Claude Q. Snedeker, Canton, Ohio

Application January 19, 1950, Serial No. 139,400

11 Claims. (Cl. 152—213)

The invention relates to anti-skid devices for the tires of automobiles and similar vehicles, and more particularly to an anti-skid device which may be easily and readily placed upon, or removed from, a tire without the necessity of jacking up the wheel.

Under present practice the conventional tire chain is the most generally used anti-skid device, but there are certain disadvantages and objections to the same. First, it is difficult and bothersome to attach these chains to the tires, requiring that each wheel be first jacked up before the chains are placed thereon.

It is also necessary for the driver or car owner to connect the ends of the chains after they have been placed around the tire, which is a difficult, inconvenient and dirty task. Also, not only are such chains hard upon the tires, but they are noisy when a section of bare pavement is encountered, and the cross chains rapidly wear through and break under such conditions, destroying their effectiveness as an anti-skid device and causing a disagreeable noise by striking against the inside of the fender with each revolution of the wheel.

The present invention therefore has as an object the overcoming of the above described disadvantages and objections to the conventional tire chains.

It is also an object of the invention to provide an anti-skid device which may be readily and easily placed upon, or removed from, a tire without the necessity of jacking up the wheel upon which the tire is mounted.

Another object is to provide such an anti-skid device which may be easily placed upon a tire entirely from the outer side of the wheel.

A further object is the provision of an anti-skid device of the character referred to which will not be hard upon the tire, and which will not be noisy or wear out rapidly, when driven over a bare pavement.

A still further object is to provide an anti-skid device comprising a ring adapted to lie against the outer side of a tire, concentric therewith, and having a plurality of radially disposed flexible conduits or tubes connected thereto for engaging over the tread portion of the tire, a flexible cable or the like being slidably located through the free ends of all of said flexible tubes and having its ends located through one of the flexible tubes and connected to means carried by said ring for tightening the cable to flex said tubes over the tread and radially inward upon the inner side of the tire.

Another object is to provide a pawl and ratchet controlled drum upon the ring for tautening said cable.

A further object of the invention is to provide an anti-skid device of the character referred to in which two flexible cables are provided, having their ends located through diametrically opposite tubes, so as to balance the device upon a tire.

A still further object is to provide such an anti-skid device in which a T-shape connection is mounted on the free end of each flexible tube to accommodate the cables.

Figure 2:
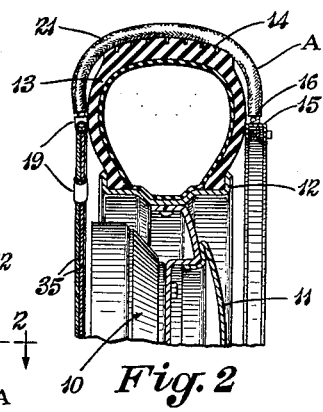
Figure 3:
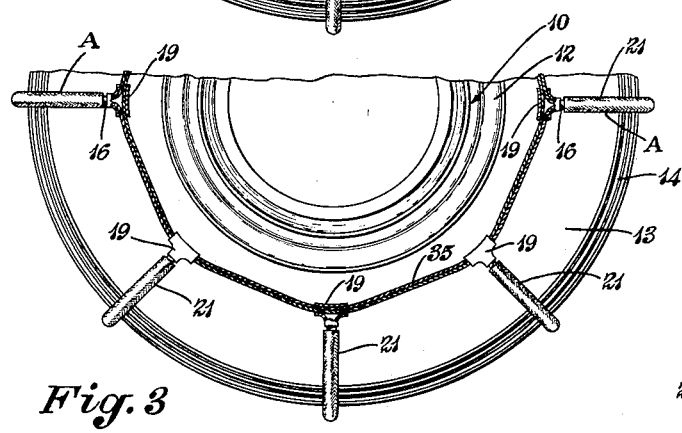
Figure 4:
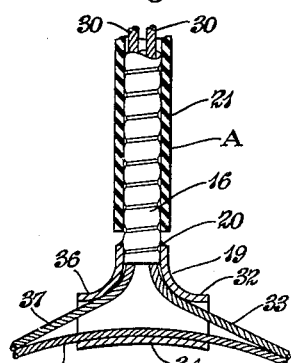
Figure 6:
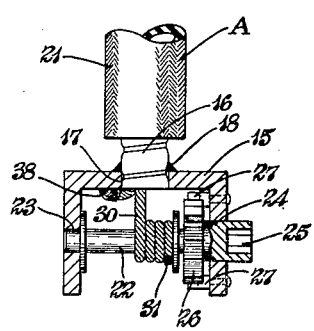
Figure 5:
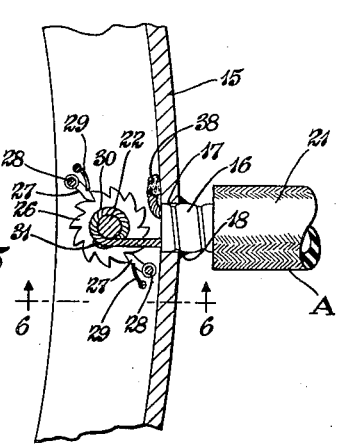

The above objects together with others which will be apparent from the drawing and following description, or which may be later referred to, may be attained by constructing the improved anti-skid device in the manner hereinafter described in detail and illustrated in the accompanying drawing, in which:

Figure 1 is an elevation of the outer side of an automobile wheel and tire, showing the improved anti-skid device mounted thereon;

Fig. 2 a fragmentary, transverse section through the wheel and tire, taken as on the line 2—2, Fig. 1, showing the manner in which the flexible conduits or tubes are engaged over the tread of the tire and held in this position during use;

Fig. 3 a fragmentary elevation of a portion of the inner side of the wheel and tire, with the anti-skid device applied thereto, parts being broken in section for the purpose of illustration;

Fig. 4 an enlarged, fragmentary, longitudinal section of the free end portion of one of the flexible conduits or tubes, showing both ends of one cable located through the T-connection and tube and a portion of the other cable located through the T-connection;

Fig. 5 a fragmentary, longitudinal section of a portion of the channel ring, showing the adjacent end of one flexible tube connected thereto, and the pawl and ratchet controlled drum for tautening the cable; and Fig. 6 a transverse section of the channel ring, taken as on the line 6—6, Fig. 5.

Referring now more particularly to the embodiment of the invention illustrated in the drawing, in which similar numerals refer to similar parts throughout, an automobile wheel is indicated generally at 10, provided with the usual hub cap 11 and rim 12, upon which is mounted the tire 13, having the tread portion 14.

All of the above parts may be of any usual and conventional construction and in themselves form no part of the invention, but are illustrated to show the manner in which applicant's anti-skid device, to which the invention pertains, may be applied to the conventional automobile tire.

The anti-skid device per se includes a ring 15, preferably of channel cross sectional shape as shown in Figs. 2, 5 and 6, which is preferably of slightly greater diameter than the rim 12 of the automobile wheel, and is adapted to lay against the outside of the tire, as best shown in Figs. 1 and 2, when the anti-skid device is mounted for use upon the tire of an automobile.

Connected at equally spaced intervals around the ring 12, and radially disposed from the periphery thereof, is a plurality of flexible conduits, or tubes 16, the adjacent ends of which are preferably located through suitable apertures 17 in the ring, as best shown in Figs. 5 and 6, and welded or otherwise rigidly attached to the ring as indicated at 18 in said figures.

A T-connection 19 is connected to the free end of each flexible conduit or tube 16, as by threading or welding as indicated at 20 in Fig. 4. A rubber hose 21 is preferably located around each flexible conduit or tube 16, between the ring 15 and the T-connection 19 thereon, so as to provide rubber treads upon said conduits or tubes for contact with the surface over which the vehicle, upon which the anti-skid device is mounted, is propelled.

Two or more oppositely disposed conduits or tubes 16, as indicated at A in the drawing, each have located within the ring 15, adjacent to their fixed ends, a spool or drum 22 having opposite ends thereof journalled through the flanges of the ring, as indicated at 23 and 24 respectively, the end 22 of the spool being preferably provided with a hexagonal socket 25, as best shown in Fig. 6.

A ratchet wheel 26 is fixed upon the spool 22 and engaged by a pair of pawls 27, pivoted as at 28 upon one flange of the channel ring 15 and spring loaded as indicated at 29 in Fig. 5. One end of a cable, or other flexible member, 30, is fixed to the spool 22, as indicated at 31.

This cable then passes through the adjacent flexible conduit or tube 16, out through one arm 32 of the T-connection 19 thereon, as indicated at 33, and then through the T-heads 34 of all of the T-connections 19, as indicated at 35, the other end of the cable passing back through the other side 36 of the T-connection upon said flexible conduit, as indicated at 37, and back through the flexible conduit A, being connected to the ring 15 as by welding or the like, as indicated at 38 in Figs. 5 and 6.

Although only one of these cables may be used, it is preferable that two or more cables be provided, the ends passing through diametrically opposite or equally spaced flexible conduits 16, as indicated at A—A in the drawing.

When it is desired to mount the improved anti-skid device upon a tire, the spools 22 are rotated in a direction to release the tension upon the flexible conduits or tubes 16 so that the free ends thereof, carrying the T-connections 19, are located in a circle larger than the outside diameter of the tire.

With the parts in this position the ring 15 is placed concentrically against the outer side of the wheel, in the position shown in Figs. 1 and 2, with the flexible conduits 16 extending over the tread of the tire toward the inner side of the wheel.

A suitable Allen wrench is then inserted into the socket 25 of each spool 22, the spools are rotated to tighten the cables 30 drawing the free ends of the flexible conduits or tubes 16, upon which the T-connections 19 are mounted, toward the center of the inner side of the wheel, as indicated in Figs. 2 and 3, flexing the conduits 16 around the tread of the tire. When the proper adjustment upon the cables is attained the pawls 27 engaging the ratchets 26 will hold the cables in tautened position.

The rubber covering 21, upon the flexible conduits or tubes 16, will not only prevent undue wear upon the tread of the tire but also minimizes noise in the operation of a vehicle equipped with these anti-skid devices.

With one end of each flexible conduit or tube 16 connected to the ring 15 and the other ends thereof merely being drawn inwardly around the tire by the cables 30, when the wheel is rotated upon the ground there will be a tendency for these flexible conduits or tubes to twist to some extent upon the tire, the free ends thereof moving backward away from the direction of rotation of the tire, giving much the effect of a rope spirally wound around the tire, which further assists in preventing side-wise skidding of the vehicle.

When it is desired to remove the anti-skid device, it is only necessary to release the springs 29 from the ratchets 26 and rotate the spools 22 in the opposite direction, releasing the tension upon the cables 30 so that the device may be removed from the tire.

From the above it will be obvious that a simple, easily installed and efficient anti-skid device is provided which may be quickly and readily attached to a tire, from the outer side of the wheel, without the necessity of raising the wheel from the ground and without requiring the operator to crawl or stoop beneath the car to make any connections from the inner side of the wheel, as all of the work of attaching the anti-skid device and the tightening of the same is done from the outer side of the wheel.

I claim:

1. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a cable slidably connected to the free ends of all of said flexible tubes, the ends of the cable passing through one of the flexible tubes to the ring, and means upon the ring for tightening said cable to draw the flexible tubes around the tread of the tire.

2. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a cable slidably connected to the free ends of all of said flexible tubes, the ends of the cable passing through one of the flexible tubes to the ring, a second cable slidable connected to the free ends of all of said flexible tubes and having its ends passing through the flexible tube diametrically opposite to said one of the flexible tubes, and means upon the ring for tightening said cables to draw the flexible tubes around the tread of the tire.

3. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a cable slidably connected to the free ends of all of said flexible tubes, the ends of the cable passing through one of the flexible tubes to the ring, and spools upon the ring for tightening said cable to draw the flexible tubes around the tread of the tire.

4. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a cable slidably connected to the free ends of all of said flexible tubes, the ends of the cable passing through one of the flexible tubes to the ring, and pawl and ratchet controlled spools upon the ring for tightening said cable to draw the flexible tubes around the tread of the tire.

5. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a T-connection on the free end of each flexible tube, a cable slidably located through said T-connections, the ends of the cable passing through one of the flexible tubes to the ring, and means upon the ring for tightening said cable to draw the flexible tubes around the tread of the tire.

6. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a T-connection on the free end of each flexible tube, a cable slidably located through said T-connections, the ends of the cable passing through one of the flexible tubes to the ring, a second cable slidably located through said T-connections and having its ends passing through the flexible tube diametrically opposite to said one of the flexible tubes, and means upon the ring for tightening said cables to draw the flexible tubes around the tread of the tire.

7. An anti-skid device for an automobile tire, comprising a ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a T-connection on the free end of each flexible tube, a cable slidably located through said T-connections, the ends of the cable passing through one of the flexible tubes to the ring, and pawl and ratchet controlled spools upon the ring for tightening said cable to draw the flexible tubes around the tread of the tire.

8. An anti-skid device for an automobile tire, comprising a channel ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a cable slidably connected to the free ends of all of said flexible tubes, the ends of the cable passing through one of the flexible tubes to the ring, and means within the ring for tightening said cable to draw the flexible tubes around the tread of the tire.

9. An anti-skid device for an automobile tire, comprising a channel ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a cable slidably connected to the free ends of all of said flexible tubes, the ends of the cable passing through one of the flexible tubes to the ring, and pawl and ratchet controlled spools within the ring for tightening said cable to draw the flexible tubes around the tread of the tire.

10. An anti-skid device for an automobile tire, comprising a channel ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a T-connection on the free end of each flexible tube, a cable slidably located through said T-connections, the ends of the cable passing through one of the flexible tubes to the ring, and means within the ring for tightening said cable to draw the flexible tubes around the tread of the tire.

11. An anti-skid device for an automobile tire, comprising a channel ring of smaller diameter than the tire and adapted to be concentrically located on the outer side of the tire, a plurality of radially disposed flexible tubes each connected at one end to the ring, said flexible tubes being disposed over the tread of the tire toward the inner side thereof, a T-connection on the free end of each flexible tube, a cable slidably located through said T-connections, the ends of the cable passing through one of the flexible tubes to the ring, and pawl and ratchet controlled spools within the ring for tightening said cable to draw the flexible tubes around the tread of the tire.

CLAUDE Q. SNEDEKER.

No references cited.